United States Patent
Nebel et al.

(10) Patent No.: US 11,879,765 B2
(45) Date of Patent: *Jan. 23, 2024

(54) APPARATUS FOR COMPOSITE SHEET WEIGHT DETERMINATIONS

(71) Applicant: HONEYWELL INTERNATIONAL INC., Morris Plains, NJ (US)

(72) Inventors: Tobias Nebel, North Vancouver (CA); Sebastien Tixier, North Vancouver (CA); Michael Kon Yew Hughes, Vancouver (CA); Gertjan Hofman, Vancouver (CA); Paul Mounter, Vancouver (CA)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 810 days.

This patent is subject to a terminal disclaimer.

(21) Appl. No.: 16/560,170

(22) Filed: Sep. 4, 2019

(65) Prior Publication Data

US 2020/0096380 A1 Mar. 26, 2020

Related U.S. Application Data

(60) Provisional application No. 62/736,839, filed on Sep. 26, 2018.

(51) Int. Cl.
*G01B 15/02* (2006.01)
*G01G 17/02* (2006.01)
(Continued)

(52) U.S. Cl.
CPC ......... *G01G 17/02* (2013.01); *G01N 21/3151* (2013.01); *G01N 21/3563* (2013.01);
(Continued)

(58) Field of Classification Search
CPC ........ G01G 17/02; G01G 9/005; G01N 21/47; G01N 21/3151; G01N 21/359;
(Continued)

(56) References Cited

U.S. PATENT DOCUMENTS 3,757,122 A * 9/1973 Bossen ...................... G06F 7/62
73/159
4,845,730 A * 7/1989 Mercer ................ G01N 23/083
378/53
(Continued)

FOREIGN PATENT DOCUMENTS

| CN | 101346625 A | 1/2009 |
| CN | 101405592 A | 4/2009 |

(Continued)

OTHER PUBLICATIONS

"Combined X-Ray/Beta Sensor Advances Nuchear Gauging Technology", IEEE Transactions on Instrumentation and Measurement, vol. IM-33, No. 3, Sep. 1984, pp. 159-163, Coats et al.*
(Continued)

*Primary Examiner* — Hoa Q Pham
(74) *Attorney, Agent, or Firm* — Stevens & Lee PC; John Maldjian, Esq.

(57) ABSTRACT

A measurement apparatus for weight measuring composite sheet including a sheet material having a second material thereon as a coating and/or as embedded particles therein. The apparatus includes an x-ray sensor for providing an x-ray signal from x-ray irradiating the composite sheet and an infrared (IR) sensor for providing an IR signal from IR irradiating the composite sheet. A computing device is coupled to receive the x-ray signal and the IR signal that includes a processor having an associated memory for implementing an algorithm, where the algorithm uses the x-ray signal and the IR signal to compute a plurality of weights selected from a weight of the sheet material, a (Continued)

weight of the second material, and a total weight of the composite sheet.

19 Claims, 3 Drawing Sheets

(51) Int. Cl.
    *G01N 21/31*     (2006.01)
    *G01N 21/3563*     (2014.01)
    *G01N 21/84*     (2006.01)
    *G01N 21/17*     (2006.01)

(52) U.S. Cl.
    CPC . *G01N 21/8422* (2013.01); *G01N 2021/1755* (2013.01); *G01N 2021/8427* (2013.01); *G01N 2201/12761* (2013.01)

(58) Field of Classification Search
    CPC ............... G01N 21/3563; G01N 21/57; G01N 21/8422; G01N 21/86; G01N 21/3559; G01N 15/088; G01N 9/24; G01N 2015/086; G01N 2015/0846; G01N 23/16; G01N 23/083; G01B 11/06
    USPC ........... 356/625–638; 250/341.8, 393, 252.1; 427/8
    See application file for complete search history.

(56) References Cited

U.S. PATENT DOCUMENTS

| | | | | |
|---|---|---|---|---|
| 4,920,265 | A * | 4/1990 | Chase | G01N 23/16 |
| | | | | 250/359.1 |
| 4,943,721 | A | 7/1990 | Vidrine, Jr. | |
| 5,795,394 | A | 8/1998 | Belotserkovsky et al. | |
| 5,866,252 | A * | 2/1999 | de Rochemont | H01L 39/143 |
| | | | | 505/703 |
| 6,074,483 | A | 6/2000 | Belotserkovsky et al. | |
| 6,179,918 | B1 | 1/2001 | Belotserkovsky | |
| 7,800,069 | B2 | 9/2010 | Shelley et al. | |
| 8,068,656 | B2 * | 11/2011 | Hirose | G01G 9/005 |
| | | | | 378/207 |
| 8,394,449 | B2 * | 3/2013 | Meijer Drees | G01B 15/025 |
| | | | | 250/252.1 |
| 11,333,544 | B2 * | 5/2022 | Nebel | G01G 17/02 |
| 11,519,867 | B2 * | 12/2022 | Hofman | G01G 9/005 |
| 2007/0145286 | A1 | 6/2007 | Hofman et al. | |
| 2007/0147584 | A1 | 6/2007 | Hofman | |
| 2010/0046703 | A1 | 2/2010 | Hirose | |
| 2018/0024053 | A1 | 1/2018 | Humphrey et al. | |
| 2020/0096380 | A1 | 3/2020 | Nebel et al. | |

FOREIGN PATENT DOCUMENTS

| | | |
|---|---|---|
| CN | 102768063 A | 11/2012 |
| DE | 112020004109 T5 | 7/2022 |
| EP | 0112079 B1 * | 9/1987 |
| EP | 1149269 A1 | 10/2001 |
| JP | 4-50572 A | 11/1992 |
| JP | 4008582 B2 | 11/2007 |
| JP | 2014025709 A | 2/2014 |
| JP | 7085064 B2 | 6/2022 |
| RU | 2257551 C2 | 7/2005 |

OTHER PUBLICATIONS

Notice of Reason for Rejection dated Jan. 28, 2022 issued in connection with corresponding JP Application No. 2021-517011 and English language translation (4 pages total).
Office Action dated Mar. 30, 2022 issued in connection with corresponding CN Application No. 201980063932.1 with English language translation (13 pages total).
Supplementary European Search Report dated Jun. 2, 2022 issued in connection with corresponding EP Application No. 19865271 (1 page total).
Written Opinion and International Search Report dated Dec. 19, 2019 issued in connection with corresponding PCT Application No. PCT/US2019052545 (7 pages total).
Written Opinion dated Jun. 20, 2022 issued in connection with corresponding KR Application No. 2021-7009219 with English language translation (17 pages total).
Intention to Grant Rule 71(3) EPC communication dated Sep. 5, 2023, issued in connection with corresponding European Patent Application No. 19 865 271.1 (9 pages total).

\* cited by examiner

APPARATUS FOR COMPOSITE SHEET WEIGHT DETERMINATIONS

This application claims the benefit of Provisional Application Ser. No. 62/736,839 entitled "MEASUREMENT APPARATUS FOR COATED OR COMPOSITE SUBSTRATE WEIGHT DETERMINATIONS," filed Sep. 26, 2018, which is herein incorporated by reference in its entirety.

FIELD

Disclosed embodiments relate to weight measurements for a composite sheet comprising a sheet material having a coating thereon or materials embedded in in the sheet material.

BACKGROUND

Ceramic-coated polyethylene (PE) or polypropylene (PP) separator membranes are important components for the performance of lithium-ion batteries that generally comprise a polymeric sheet material as the separator membrane. The separator membrane provides an ion-permeable barrier between the cathode and the anode of the lithium-ion battery. These separator membranes are porous and if provided uncoated generally start to degrade at temperatures of around 120° C. causing the lithium-ion battery to short-circuit and thus fail. A ceramic coating (e.g. $Al_2O_3$) applied to the separator membrane is known to help to improve the separator's temperature-stability to up to about 200° C., but results in decreased separator membrane permeability and increased weight.

For measurement of the coating weight of the separator membrane's coating, an infrared (IR)-based weight sensor (IR sensor) is known. IR sensors analyze specific spectral regions in the near- and mid-infrared that are sensitive to the separator membrane and/or to the coating. Ceramics absorb at relatively long wavelengths in the IR which requires sensitive and cooled detectors. This poses a challenge when online measurements with high signal to noise ratios (SNRs) are required. Nuclear gauges (e.g., beta gauges) are also known for determining the coating weight as well as the weight of the separator membrane, but this measurement system is based on a subtractive method that requires at least two scanners. In addition, nuclear gauges are often unwanted due to radiation safety concerns.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize industries such as the lithium-ion battery industry needs a cost effective non-nuclear solution for determining a plurality of weights for a composite sheet having a second material as a coating material on and/or embedded particles in a generally polymeric sheet material, including the weight of the sheet material, the weight of the second material, and the total weight of the composite sheet. It is moreover recognized that a one-scanner solution that avoids nuclear gauges is desirable to avoid known safety issues.

Disclosed aspects include a measurement apparatus for weight measuring of composite sheets that comprise a sheet material having a second material thereon as a coating and/or with embedded particles therein. The apparatus includes an x-ray sensor for providing an x-ray signal from irradiating the composite sheet and an IR sensor for providing an IR signal from irradiating the composite sheet. A computing device is coupled to receive the x-ray signal and the IR signal that includes a processor having an associated memory for implementing an algorithm, where the algorithm uses the x-ray signal and the IR signal to compute a plurality of weights selected from a weight of the sheet material, a weight of the second material, and a total weight of the composite sheet. The measurement apparatus generally includes a movable scanner head for scanning the respective sensors, such as shown in FIG. 1 described below.

DETAILED DESCRIPTION

Figure 1:
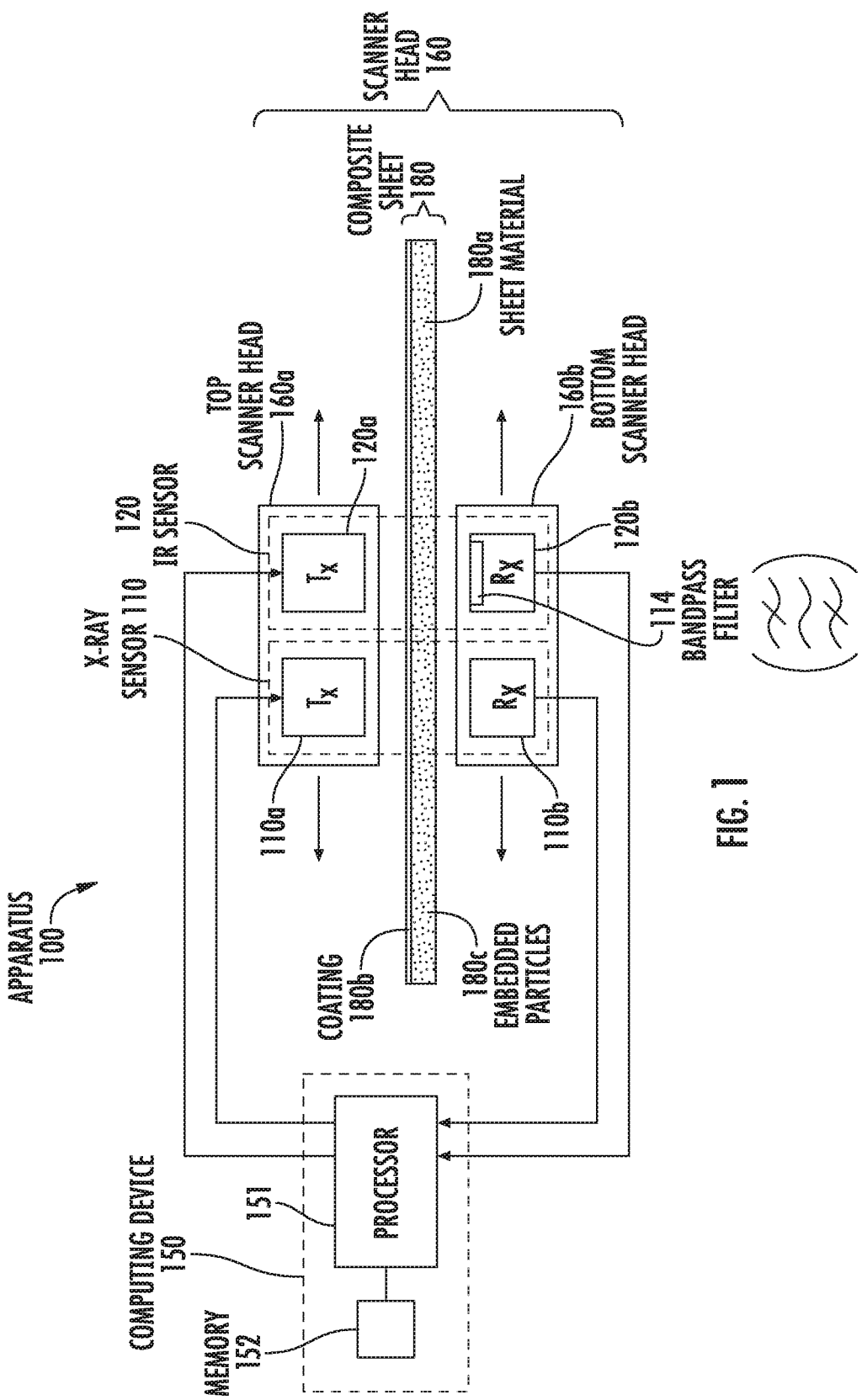
FIG. 1 is a depiction of an example measurement apparatus including an x-ray sensor and an IR sensor configured as a transmissive sensor for determining at least two weights of a composite sheet selected from a weight of the sheet material, a weight of the second material, and a total weight for the composite sheet, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

Disclosed measurement apparatus comprise two different sensors including an x-ray sensor and an IR sensor that are used together to measure properties of a composite sheet such as a separator sheet for lithium-ion battery after the second material is applied to the sheet material. FIG. 1 is depiction of an example measurement apparatus 100 for weight measurements for a composite sheet 180, according to an example embodiment. The composite sheet 180 comprises a sheet material 180a having a second material thereon as a coating 180b and/or with embedded particles 180c therein.

Figure 2:
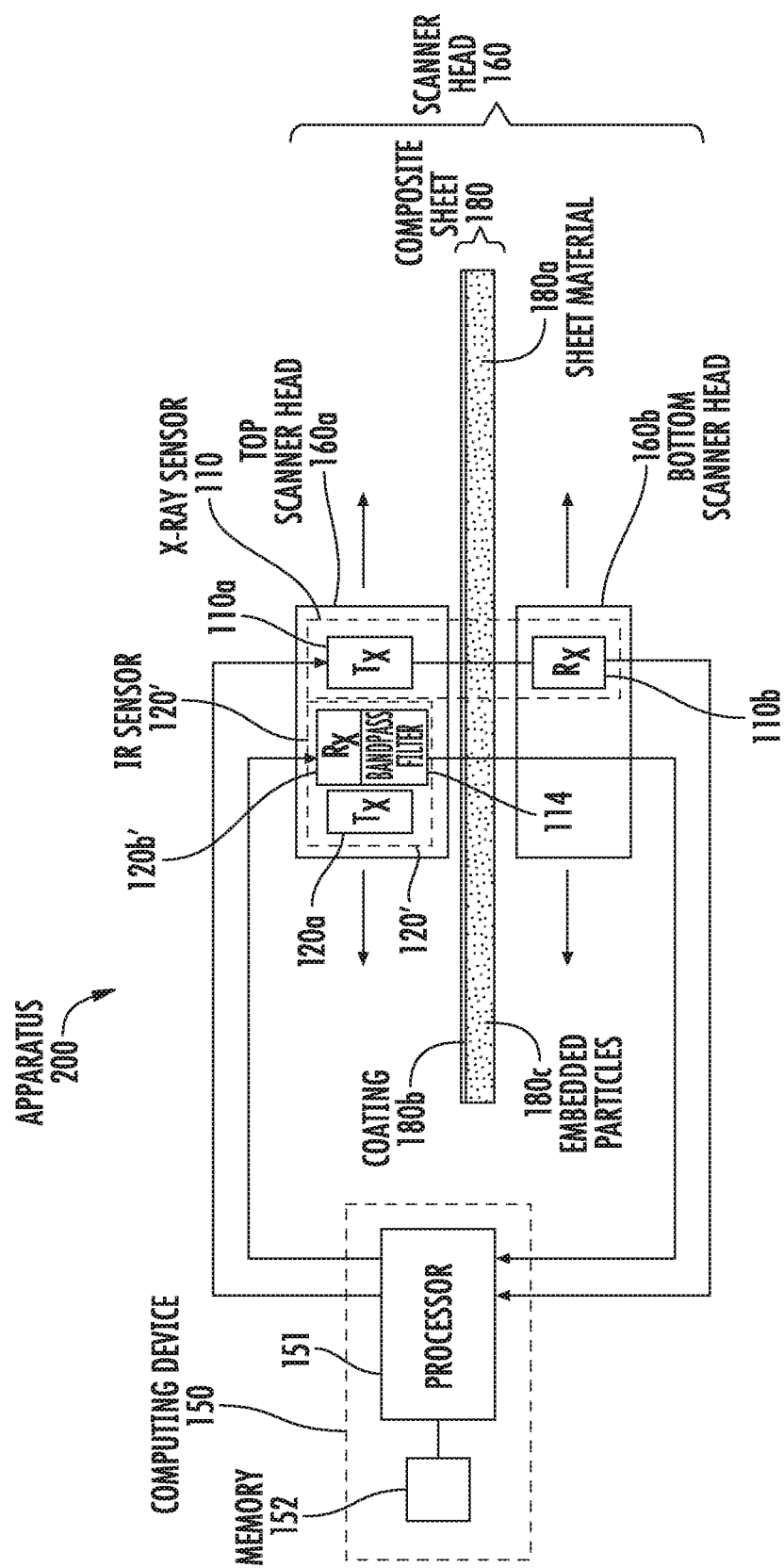
FIG. 2 is a depiction of an example measurement apparatus including an X-ray sensor and an IR sensor configured as a reflective sensor for determining weights of a composite sheet including at least two weights for a composite sheet selected from a weight of the sheet material, a weight of the second material, and a total weight for the composite sheet, according to another example embodiment.

The measurement apparatus 100 includes an x-ray sensor 110 and an IR sensor 120 for determining two or more of the weight of the sheet material 180a, the weight of the second material, and a total weight for the composite sheet 180. The x-ray sensor 110 and an IR sensor 120 are both shown as transmission sensors in FIG. 1, and therefore both have upper and lower halves with in the upper half an x-ray source 110a shown as $T_X$ and IR transmitter 120a shown as $T_X$, and in the lower half an x-ray detector 110b shown as $R_X$ and an IR detector 120b shown as $R_X$. The IR sensor 120 can alternatively be reflection-based sensor as shown in FIG. 2 described below, but the x-ray sensor 110 is generally a transmission sensor.

The IR sensor 120 can utilize a commercially available IR sensor for measurements up to a wavelength of about 12 μm to examine certain spectral regions characteristic to composite sheets that may comprise a ceramic coated plastic separator membrane by applying spectral filters shown as the bandpass filter 114 shown in FIG. 1 to an IR signal. One spectral region (~3.4 μm for PE) covers a usually very distinct absorption peak. One or more spectral filters can cover reference regions in the close vicinity of the absorption peak (see FIG. 4 described below).

A background-free absorption signal can be calculated from the IR spectrum using the reference measurements. One embodiment does not use reference measurements, by instead relying on a non-background corrected IR signal. The signal produced by the IR sensor 120 is generally mostly sensitive to the sheet material 180a, while the signal from the x-ray sensor 110 is generally mostly sensitive to the weight of the second material. IR is mostly sensitive to the sheet material 180a when the sheet material absorption peaks are selected (as in FIG. 4, i.e. the 3.4 μm PE absorption peak). X-ray is mostly sensitive to the second material as the second material contains a high-Z material (e.g., Al, Si or a Zr containing material, such as $Al_2O_3$, $SiO_2$ or $ZrO_2$) as compared to sheet material 180a (such as a PE or a PP polymer substrate).

The measurement apparatus 100 comprises a scanner head 160 including a top scanner head 160a and a bottom scanner head 160b for mounting the components of the x-ray sensor 110 and the IR sensor 120. Position control of the scanner head 160 is well-known. The scanner head 160 can scan over part of the width, or the entire width, of the composite sheet 180, including during its production.

Inside the scanner heads 160a, 160b, the x-ray and IR sensors 110, 120 are mounted along a line that can either be parallel to the machine direction (MD) or be in a cross direction (CD). The scanner heads 160a, 160b scan across the composite sheet 180 to develop a representation of the composite sheet 180 sometimes referred to as a 'web' which is moving between the scanner heads 160a, 160b. Signals from the respective detectors 110b, 120b are generally processed by electronics (not shown) including a filter, an analog-to-digital converter (ADC) and an amplifier, which is then conveyed to a computing device 150 including a processor 151 having an associated memory 152. Also not shown is electronics between the processor 151 and the x-ray and IR sources 110a, 120a that generally comprises at least a digital-to-analog converter (DAC).

The processor 151 takes the sensor measurements received from the x-ray sensor 110 in the IR sensor 120 and calculates the second material weight (in this example the coating weight) using an algorithm or digital logic. It is noted that some of this processing can take place within the respective sensors 110, 120 themselves. There can be other inputs to the processor 151, such as the head position of the scanner heads 160a, 160b or the machine direction position. The output from the processor 151 can just be the second material weight in the form of a coating 180b and or embedded particles 180c in the sheet material 180a as a function of position, or some sort of control signal for controlling coaters that apply a second material coating on a sheet material 180a such as a separator sheet. The processor 151 can also output a signal to control the second material weight being applied to the sheet material 180a.

The x-ray sensor 110 (e.g., being configured to operate at 3 keV to 6 keV, such as 4 keV to 5 keV) provides a measurement for the total weight of the composite sheet 180. However, due to higher density and higher atomic numbers of the second material as compared to the sheet material 180a, the x-ray measurement is generally about 10 times more sensitive to the second material weight than to weight of the sheet material 180a when the sheet material 180a comprises a plastic membrane.

By measuring the respective inputs from the detectors 110b, 120b of the x-ray sensor 110 and IR sensor 120, one can determine two of three possible outputs: the weight of the sheet material 180a, a weight of the second material, and a total weight of the composite sheet 180. The third weight can be calculated from the first two. The overall measurement can be calibrated by performing a two-predictor (x-ray and IR) partial least square regression (or a similar statistical method such as principal component analysis (PCA)) on a set of composite sheet samples with known sheet material weight and coating weight spectrum parameters.

FIG. 2 is depiction of an example measurement apparatus 200 including an x-ray sensor 110 and an IR sensor 120' configured as a reflective sensor for determining weights for a composite sheet 180 including at least two weights for a composite sheet 180 selected from the weight of the sheet material 180a, the weight of the second material, and a total weight for the composite sheet 180, according to an example embodiment.

Disclosed embodiments thus include the IR-sensor portion in either a transmission or in reflection configuration, both either performed in a direct line of sight measurement or in an offset-setup looking at scattered light, while using at least one IR spectral region. The IR-sensor 120 (in FIG. 1) or IR-sensor 120' (in FIG. 2) can cover spectral regions all the way out to the long wave IR (LWIR), such as to 14 μm. One can use the IR signature to determine different grades of composite sheet 180 samples, such as grouped into two different grades. These groups differ in certain IR spectral features which can be used to select an appropriate calibration. In case of a PE as the sheet material 180a, the spectral region can be for example ~2.4 μm, ~3.4 μm, ~6.8 μm, at ~13.8 μm, or general any combination thereof.

Disclosed aspects provide benefits including the x-ray measurement providing a total weight measurement of a composite sheet 180 such as a coated separator membrane which as noted above is generally about 10 times more sensitive to the coating weight than it is to the sheet material 180a (e.g., membrane) weight changes. In one embodiment where an accuracy for the coating weight measurement of about 10% is sufficient and the sheet material (e.g., separator membrane) thickness is known a priori (e.g., through a caliper measurement), an x-ray only measurement can generally be sufficient.

The disclosed combination of x-ray and IR sensor measurements enables determining the weight of the sheet material 180a and the weight of the second material as a coating and/or embedded in the sheet material 180a side-by-side on one measurement apparatus 100 shown in FIG. 1 or apparatus 200 shown in FIG. 2. Compared to known 2-scanner and nuclear (known as beta gauge) solutions, disclosed solutions are cost effective particular when mounted on a scanner head 160.

Disclosed embodiments can be applied generally to determine the weight of any coating or embedded material for any sheet material 180a, for example a ceramic coating in or on a polymer sheet. Both the second material (as a coating and/or as an embedded material) and the sheet material 180a can be porous. The sheet material 180a can comprise multiple layers of different polymers, for example polymer layer stacks comprising PE/PP/PE, PP/PE/PP, PE/PP/PE/PP/PE.

EXAMPLES

Disclosed embodiments are further illustrated by the following specific Examples, which should not be construed as limiting the scope or content of this Disclosure in any way.

Figure 3:
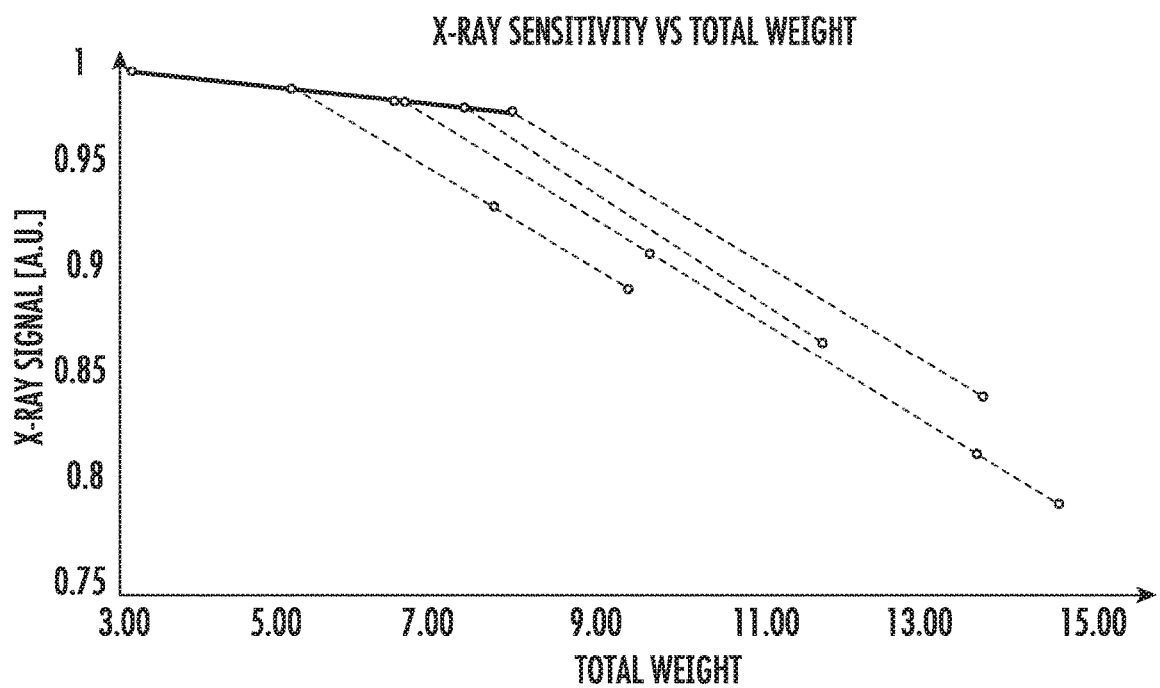
FIG. 3 is an x-ray sensitivity plot that illustrates a working principle of disclosed aspects that depicts the expected response of the x-ray sensors when different composite sheet samples are measured.

FIG. 3 shows an x-ray sensitivity plot that illustrates a working principle of disclosed aspects. FIG. 3 depicts the expected response of the x-ray sensor 110 when different composite sheet 180 samples are measured. These composite sheet samples comprised a PE or PP sheet material 180a layer generally with a coating 180b thereon comprising aluminum oxide. Data groups with constant weight of the sheet material 180a are visually supported by the dotted lines shown. Along the dotted lines, only the weight of the coating 180b changes while the weight of the sheet material 180a remains constant. The solid line shown connects the data of the composite sheet 180 samples without a coating so that only the sheet material weight varies.

The two different slopes of these lines indicate that the x-ray sensor measurement is more sensitive to coating 180b weight changes than it is to sheet material 180a weight changes. This is due to the coating 180b having a higher-Z (atomic number; such as including aluminum which has an atomic number 13, for example in the case of aluminum oxide) component compared to the carbon in the polymer of the sheet material 180a causing stronger x-ray absorption compared to the sheet material 180a. FIG. 3 also illustrates that the x-ray measurement is mostly sensitive to coating 180b weight changes. On the other hand, an IR-measurement is tailored to a specific absorption feature of the sheet material 180a by choosing appropriate IR-filters (see the bandpass filter 114 shown in FIG. 1 and FIG. 2 described above) which will thus be mostly sensitive to sheet material 180a weight changes. This way, two fairly independent measurements (from the x-ray sensor and from the IR sensor) can be used to determine two unknown weights of a composite sheet 180 including a coating 180b on a sheet material 180a, such as the weight of the sheet material 180a, and the weight of the coating 180b.

Figure 4:
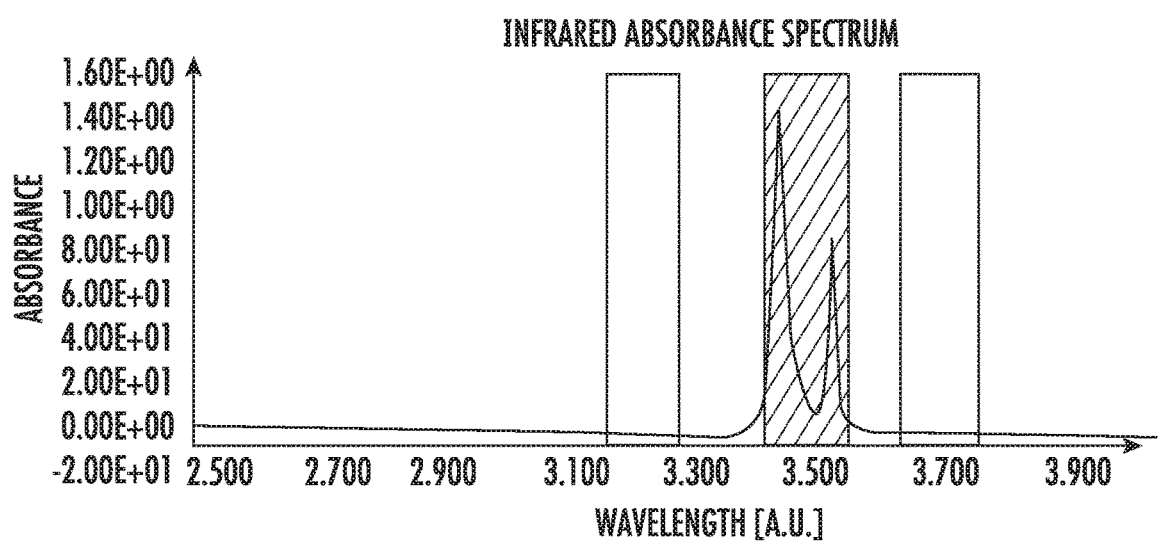
FIG. 4 shows a plot of an example IR absorption spectrum of one particular composite sheet sample vs. wavelength λ (in arbitrary units (A.U.), for instance in micrometers (μm)).

FIG. 4 shows a plot of an example IR absorption spectrum of one composite sheet sample vs. wavelength λ in A.U., for instance in μm. An optical IR filter added to the IR sensor extracts the signal produced by the sheet material 180a. Optical filters applied to the left (lower wavelength) and right (higher wavelength) of the sheet material 180a feature can be used to provide a reference baseline level that can improve the signal quality. Providing a reference-baseline level is optional. Using one or more reference signals is well-known in the art as a way to correct the measured signal from variations due to electronic component drift, lamp power and variations in the scattering power of the sheet. Pore sizes in the sheet material are generally of the same order of magnitude as the wavelength of the IR light from the IR sensor therefore in addition to be absorbed by the sheet material 180a, IR light is generally significantly scattered. Light scattering power may be affected by changes in the pore size distribution.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

The invention claimed is:

1. A measurement apparatus for weight measuring of a composite sheet comprising a sheet material having a second material thereon as a coating or as embedded particles therein, comprising:
   an x-ray sensor including an x-ray source and an x-ray detector for providing an x-ray signal from X-ray irradiating the composite sheet;
   an infrared (IR) sensor including at least one IR source, at least one IR filter and at least one IR detector for providing an IR signal from IR irradiating the composite sheet, wherein the IR sensor comprises a transmissive sensor, and
   a computing device coupled to receive the x-ray signal and the IR signal including a processor having an associated memory for implementing an algorithm,
   wherein the algorithm uses the x-ray signal and the IR signal to compute two or more of a weight of the sheet material, a weight of the second material, and a total weight of the composite sheet without the use of at least one beta gauge and without the use of at least one nuclear gauge.

2. The measurement apparatus of claim 1, further comprising a scanner head, wherein the x-ray sensor and the IR sensor are both moveable by the scanner head for scanning the composite sheet to generate a two-dimensional (2D) measurement profile.

3. The measurement apparatus of claim 1, wherein the IR sensor comprises a reflective sensor.

4. The measurement apparatus of claim 1, wherein the IR filter comprises a bandpass filter.

5. The measurement apparatus of claim 1, wherein the algorithm utilizes a calibration table relating an output of the measurement apparatus to the weight of the sheet material, the weight of the second material, and the total weight of the composite sheet, and utilizes the calibration table for the determining of the plurality of weights.

6. The measurement apparatus of claim 1, wherein the sheet material comprises pores, wherein the algorithm further utilizes a reference baseline level to provide a correction for effects of light scattering by the pores.

7. The measurement apparatus of claim 1, wherein the X-ray sensor is configured to utilize an energy from 3 keV to 6 keV.

8. A method of analyzing a composite sheet comprising a sheet material having a second material as a coating thereon or as embedded particles therein, comprising:
   determining an x-ray signal from X-ray irradiating the composite sheet using an x-ray sensor;
   determining an infrared (IR) signal from IR irradiating the composite sheet using an IR sensor, wherein the IR sensor comprises a transmissive sensor, and determining from the x-ray signal and the IR signal two or more of a weight of the sheet material, a weight of the second material, and a total weight of the composite sheet without the use of at least one beta gauge and without the use of at least one nuclear gauge.

9. The method of claim 8, wherein the determining the plurality of weights comprises using an algorithm implemented by a computing device.

10. The method of claim 8, wherein the second material comprises a ceramic material, and wherein the sheet material comprises a polymer material.

11. The method of claim 10, wherein the ceramic material comprises $Al_2O_3$, SiO or $ZrO_2$, and wherein the polymer material comprises polyethylene (PE) or polypropylene (PP), or a combination of the PE and the PP.

12. The method of claim 10, wherein the composite sheet comprises at least one of multiple layers of the ceramic material and multiple layers of the polymer material.

13. The method of claim 8, wherein the composite sheet comprises a separator configured for a lithium ion battery.

14. The method of claim 8, wherein the second material comprises a ceramic material that is at least partially embedded in the sheet material.

15. The method of claim 8, wherein the second material comprises a ceramic material this is all in the coating.

16. The method of claim 8, wherein a first portion of the second material is embedded in the sheet material and a second portion of the second material is on top of the sheet material as the coating.

17. The method of claim 8, wherein a plurality of samples of the composite sheet each with a different weight of the sheet material and a different weight of the second material are provided to a measurement apparatus including the x-ray sensor and the IR sensor, further comprising generating a calibration table relating an output of the measurement apparatus to the weight of the sheet material, the weight of the second material, and the total weight of the composite sheet, and using the calibration table for the determining of the plurality of weights.

18. The method of claim 8, wherein the sheet material comprises pores, and wherein the determining comprises utilizing an algorithm that further utilizes a reference baseline level to provide a correction for effects of light scattering by the pores.

19. The method of claim 8, wherein the method is implemented during production of the composite sheet with the plurality of weights used to control at least one parameter of a coating process used to form the second material.

* * * * *